(12) United States Patent
Collins et al.

(10) Patent No.: US 7,250,775 B1
(45) Date of Patent: Jul. 31, 2007

(54) MICROFLUIDIC DEVICES AND METHODS BASED ON MEASUREMENTS OF ELECTRICAL ADMITTANCE

(75) Inventors: John Collins, Irvine, CA (US); Abraham Lee, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/987,179

(22) Filed: Nov. 12, 2004

Related U.S. Application Data

(60) Provisional application No. 60/519,678, filed on Nov. 12, 2003.

(51) Int. Cl.
*G01R 27/08* (2006.01)
*G01R 27/26* (2006.01)
(52) U.S. Cl. .................. 324/692; 324/713; 324/667
(58) Field of Classification Search ............. 73/861.08, 73/861.12; 324/425, 439, 444, 71.4, 446, 324/449, 692, 693, 713
See application file for complete search history.

(56) References Cited

U.S. PATENT DOCUMENTS

| | | | | |
|---|---|---|---|---|
| 3,210,261 A | * | 10/1965 | Tyler | 204/406 |
| 4,484,582 A | * | 11/1984 | Rottenberg et al. | 600/308 |
| 4,875,488 A | * | 10/1989 | Shimazu et al. | 600/507 |
| 5,824,494 A | * | 10/1998 | Feldberg | 435/40 |
| 6,441,625 B1 | * | 8/2002 | McAllister et al. | 324/691 |
| 6,641,708 B1 | * | 11/2003 | Becker et al. | 204/547 |
| 6,801,041 B2 | * | 10/2004 | Karinka et al. | 324/444 |
| 6,973,840 B2 | * | 12/2005 | Cushing | 73/861.17 |
| 2003/0010135 A1 | * | 1/2003 | Maxit et al. | 73/861.79 |
| 2003/0102854 A1 | * | 6/2003 | Gascoyne et al. | 324/71.4 |
| 2004/0011650 A1 | * | 1/2004 | Zenhausern et al. | 204/547 |
| 2004/0100284 A1 | * | 5/2004 | Lee et al. | 324/663 |
| 2004/0161772 A1 | * | 8/2004 | Bohm et al. | 435/6 |
| 2005/0211559 A1 | * | 9/2005 | Kayyem | 204/601 |

* cited by examiner

*Primary Examiner*—Anjan Deb
(74) *Attorney, Agent, or Firm*—Robert D. Buyan; Stout, Uxa, Buyan & Mullins, LLP.

(57) ABSTRACT

Microfluidic devices and methods that use electrical admittance as the basis for measuring flow rate of fluids and/or for distinguishing (e.g., characterizing, sorting, separation, etc.) different particles, chemical compositions or biospecies (e.g., different cells, cells containing different substances, different particles, different chemical compositions, etc.).

28 Claims, 13 Drawing Sheets

MICROFLUIDIC DEVICES AND METHODS BASED ON MEASUREMENTS OF ELECTRICAL ADMITTANCE

RELATED APPLICATION

This application claims priority to U.S. Provisional Patent Application Ser. No. 60/519,678 filed on Nov. 12, 2003, the entirety of which is expressly incorporated herein by reference.

FIELD OF THE INVENTION

The present invention relates generally to medical devices and methods and more particularly to microfluidic devices and methods for measuring flowrate of fluids and/or distinguishing (e.g., characterizing, sorting, separation, etc.) different biospecies (e.g., different cells, cells containing different substances, different particles, different chemical compositions, etc.).

BACKGROUND OF THE INVENTION

Micrototal analysis systems of the prior art have typically required integrated sensors to be positioned in the fluidic circuit for the control and analysis of cells. Most of those prior art sensors use optical detection in the form of fluorescence spectroscopy, surface plasmon resonance, surface enhanced raman scattering, radiological detection or impedance measurements. Sensors based on impedance measurements can, in at least some applications, be advantageous because they are relatively simple and can be miniaturized for easy integration into a catheter, implantable device, etc. However, impedance measurements of biomaterials traditionally have very broad spectral responses that cannot be used for distinguishing different biospecies.

When electrolytic fluids flow in a microchannel under laminar flow conditions, a parabolic velocity profile exists such that ions in the middle of the microchannel travel faster than ions near the walls of the microchannel. Thus ions become redistributed in an electric double layer (EDL) within the microchannel. Delivery of ac voltage across the microchannel channel electrodes causes the ions to move back and forth across the electrodes. Electrokinetic effects develop as a result of the ionic redistribution and such electrokinetic effects contribute to changes in electric admittance. Thus the flow of fluid is very sensitive to the admittance across microelectrodes and in the microchannel. Thus, measuring the increase in electrical admittance can precisely account for the flow rate of the electrolytic fluid.

The electrical admittance of a liquid and particles suspended in a liquid increases when they are passed across channel electrodes. This increase of admittance shows spectral behavior with the stimulating electrical signal. The flow induced spectral response shows a characteristic signature for different cells or particles. Interaction between the electrical and viscous stress on the fluid is the main cause that gives rise to spectroscopic behavior. A critical frequency is defined as:

$$f_c = \frac{\sigma}{2\pi\varepsilon}$$

where $\sigma$ and $\varepsilon$ are the electrical properties of conductivity and permittivity of the buffer solution, respectively. For $f < f_c$, the electrical field functions in a resistive manner, while the double layer functions in a capacitive manner.

Thus, there exists a potential for development of devices and methods which utilize electrical admittance as the basis for measuring fluid flowrates and/or for distinguishing biospecies (e.g., cell characterization, cell sorting, distinguishing different biochemicals, etc.).

SUMMARY OF THE INVENTION

In accordance with the present invention, there are provided methods for measuring the flow rate of a conducting fluid in a microchannel, wherein a voltage is applied across a pair of electrodes placed in the microchannel and the current flowing across the electrodes is measured. The measured current is may be compared to a base current (i.e., the amount of current that results in no flow between the electrodes) and the change in flow rate is calculated as a function of the change in the measured current.

Still further in accordance with the invention, there are provided methods for distinguishing biospecies (e.g., cell characterization, cell sorting, distinguishing different biochemicals, etc.) wherein the difference in electrical admittance is determined, at various frequencies, of the cells that are flowing and cells that are still. Characteristic peak, bandwidth of the peak and asymmetry of the peak are utilized to characterize different types of cells. In at least some application of this method, the cells may be characterized to extract electrical signatures in order to sort and/or isolate certain cell types (e.g., stem cells).

Still further in accordance with the invention, there are provided microfluidic devices for carrying out the above-summarized methods. A microfluidic device of the present invention generally comprises a) at least two electrodes positioned parallel to the direction of flow, b) apparatus (e.g., a source of ac current) for applying a voltage across the electrodes and c) apparatus for measuring the rms voltage across the resistor (e.g., a resistor placed in series with the electrodes and a voltage measuring apparatus). This device may comprise a microfluidic device that has a substrate layer and an upper layer, wherein the electrodes are located (e.g., fabricated, formed, affixed to or otherwise disposed on or in) one of the layers (e.g., on the substrate layer) and the microchannel is located (e.g., fabricated, formed, affixed to or otherwise disposed on or in) in the other layer (e.g., in the upper layer). The layers of the device may be fully or partially formed of different materials. For example, the layer in or on which the electrodes are located (e.g., the substrate layer) may comprise a glass and the layer on or in which the microchannel is located (e.g., the upper layer) may comprise a suitable polymeric material such as polydimethylsiloxane (PDMS).

Further aspects, elements and details of the present invention are described in the detailed description and examples set forth herebelow.

BRIEF DESCRIPTION OF THE DRAWINGS

FIG. 4A is a graph of current vs. flow rate, showing the instantenous value of RMS current which depends on flow rate when flow is commenced at 10 µL/min and is incrementally increased by 5 µL/min at 1 minute intervals, as described in Example 1.

FIG. 4B 1 is a graph of current vs. time, showing increases in RMS current due to flow when flow is commenced at 10 µL/min and is incrementally increased by 5 µL/min at 1 minute intervals, as described in Example 1.

FIG. 8A shows the instantaneous current values with the variation and switching of flows. The results of FIG. 8A are re-plotted in FIG. 8B. Also shown the right axis of 8B is the velocity of beads at different flow rates of the fluid. (The peaks in 8A correspond to the flow rate values labeled.)

DETAILED DESCRIPTION AND EXAMPLES

The following detailed description and the accompanying drawings are intended to describe some, but not necessarily all, examples or embodiments of the invention only and shall not limit the scope of the invention in any way.

A. Electrical Admittance Based Flow Sensing

The development of multifunctional, high throughput lab-on-a-chip depends heavily on the ability to measure flow rate and perform quantitative analysis of fluids in minute volumes. Traditionally, there have been many microelectromechanical system (MEMS) based flow sensors for gaseous flows. In recent times, there is some advancement in measuring micro flows of liquids. Examples of sensing principles explored in the measurement of microfluidic flow are heat transfer detection molecular sensing, atomic emission detection, streaming potential measurements, electrical impedance tomography, ion-selective field-effect transistor and periodic flapping motion detection. Flow sensors form the integral part of micrototal analysis system with multi-sensors. Conversely, a measure of electric current is used for pumping a measurable flow rate of fluids in electro-osmotic flow (EOF).

Flow sensors based on sensing the temperature difference between two points in the microchannel can sense very low flows. However, such flow sensors require a complicated design and the integration of the heater, temperature sensors and membrane shielding is difficult to implement. Moreover, the sensitivity and accuracy of the flow sensors depend on the environment associated in the heat transfer. Most other methods are not capable of measuring very low flow rates. We consider flow sensing by directly measuring the electrical admittance of the fluid using two surface electrodes.

In electrolytes flowing in a microchannel under laminar flow conditions, a parabolic velocity profile exists and so the ions in the middle of the channels travel faster than those near the walls. This results in the redistribution of ions within the electric double layer (EDL) formed in the channel. The ac voltage across the channel electrodes (FIG. 3) drives the ions back and forth across the electrodes. The ionic redistribution develops electrokinetic effects and contributes to change in electric admittance. Thus the flow of fluid is very sensitive to the admittance across microelectrodes in the flow channels, and measuring the increase in admittance precisely accounts for the flow rate. Our flow sensor operating with optimized electric parameters can be efficient and accurate for precise values of flows. This method is relatively simple and suitable for most of the chemical and biochemical microfluidic applications since most of the reagents used are electrolytes. In this paper, we present such a flow sensor based on the measurement of electrical admittance.

Figure 1:
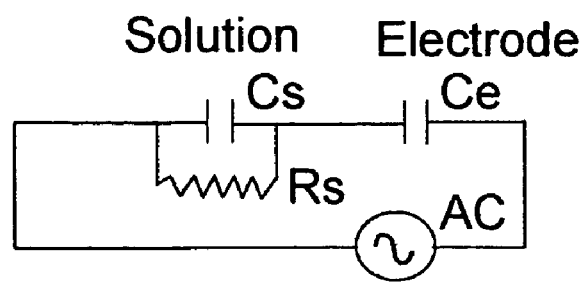
FIG. 1 is a schematic diagram of a circuit for the channel and electrodes of a flow sensor cell of the present invention. The solution in the channel offers a parallel resistive (Rs) and capacitive (Cs) impedance while the electrodes by themselves offer serial capacitive (Ce) impedance with the solution.

In hydrodynamic conditions, forced convection dominates the transport of ions to the electrodes within the flow channels. When the width of the microfluidic channel is very small compared to the length of the channel, the lateral diffusion of the ions is significant under laminar flow. Under an ac electrical signal applied across the channel, the equivalent circuit of the microsystem is shown in FIG. 1. The electrical double layer formed across the channel is formed from two capacitances namely diffuse layer capacitance (Cs) and the outer Helmholtz plane capacitance (Ce). The former is due to ion excess or depletion in the channel, and the latter is due to the free electrons at the electrodes and is independent of the electrolyte concentration. The smaller of these capacitances dominates the admittance since these two capacitances are in series. The frequency of the applied ac voltage, flow rate and conductivity of the fluid are the factors affecting the admittance of the fluidic system and our flow sensing principle is based on the optimization of these parameters.

For an electrochemical oxidation of a species A to A$^+$ in a microchannel, the convective-diffusive equation for mass transport under steady state condition is given by Equation 1 as follows:

$$D_A \frac{\partial^2 [A]}{\partial y^2} - v_x \frac{\partial [A]}{\partial x} = 0$$

wherein [A] is the concentration of the species, $D_A$ is the diffusion coefficient and $v_x$ is the velocity in the direction of flow. The first term is the lateral diffusion in the microchannel and the second term is the transport along the length of the channel.

Under steady state flow condition the boundary condition is given by Equation 2 as follows:

$$\frac{\partial A}{\partial t} = 0$$

However, the solution of Equation 2 predicts the mass transport limited current, $i_L$ as a function of flow rate, Q as determined by Equation 3, as follows:

$$i_L = 0.925 \, nF[A]_{bulk} D_A^{2/3} Q^{1/3} w \cdot \sqrt[3]{x_e^2/h^2 d}$$

wherein n is the number of electrons transferred, F, the Faraday constant, $x_e$ is the electrode length, h, the cell half-height, d, the width of the cell and w, the electrode width. It is to be noted that the current due to flow of electrolyte is directly proportional to the cube root of volume flow rate of the fluid. AC voltage signal is considered rather than dc voltage since the application of an ac voltage in the flow sensor does not promote any electrode reaction. Optimization of the electrical parameters like voltage and frequency of the ac signal are considered as an operating condition for measuring low flow rates. This optimizes the distance of movement of ions and their realization behavior across the channel electrodes so that the current admittance suffered is maximum.

EXAMPLE 1

Figures 2A, 2B:
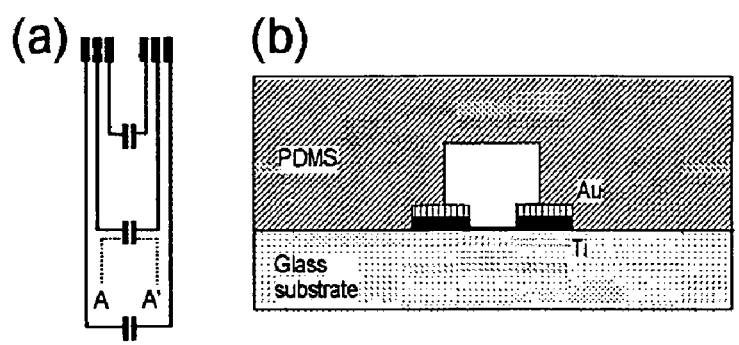
FIG. 2A is a schematic diagram showing the layout design of fabricated electrodes and the wiring for measuring the current flow.
FIG. 2B is a cross-section of fabricated flow sensor along the electrodes at line B-B of FIG. 2A.

Fabrication and Operation of an Electrical Admittance Based Microfluidic Flow Sensor In this example, a flow sensor is fabricated on a glass substrate with gold surface electrodes (FIG. 2A) and the microfluidic channel is made on PDMS. Gold metal of thickness 100 nm is deposited on a adhesion layer of titanium with thickness 20 nm using e-beam deposition. A spinned layer of Shipley photoresist (1827) is used for patterning (FIG. 2B) the metal. The electrodes are patterned by etching gold and titanium by potassium iodide solution (KI+I$_2$+H$_2$O=4:1:40) and 2% HF respectively. The Shipley photoresist is removed with acetone. The distance between the electrodes is 100 μm and the length of the electrodes is 5 mm. Gold electrical lines are patterned on the glass as shown in FIG. 2a for the electrical measurement. Measurement is done across one of the three electrodes. PDMS channels of width 500 μm are made from an SU8 mold. Glass and PDMS are bonded together after treatment with oxygen plasma for 1 minute. The fluidic channel is aligned with the parallel electrodes using a stereo microscope.

Figure 3:
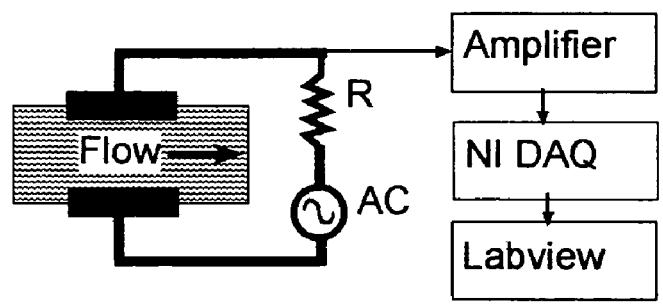
FIG. 3 is a schematic diagram of an experimental Setup for measuring current increase due to flow of electrolytes (Standard Resistance R=1 kΩ, AC is the ac signal source, NI DAQ is PCI 6024E), as described in Example 1.

The measuring instrumentation is similar to that used in strain gauge or thermocouple interfaces. An ac voltage is applied across the channel electrodes in series with a standard resistor. The voltage across the resistor is fed to a National Instrument's data acquisition card (NI DAQ PCI 6024E) through the signal conditioner (SCXI 1100) as shown in FIG. 3. The rms values of voltage across the standard resistor are measured in Labview with a scanning rate of 20,000 samples/sec and averaging every 10,000 samples.

Sodium hydroxide (NaOH) solutions with conductivities ranging from 5 to 200 mS/cm (corresponding to 0.01 M to 1 M) are prepared with NaOH pellets bought from Fisher Scientific. The concentration of the NaOH solution is chosen at 0.8 M and experiments are carried out for frequency and current response. Microfluidic flow is maintained at a constant flow rate using a Harvard Picoplus Syringe pump. An ac signal of rms voltage 0.05 V is applied in the circuit by a signal generator. The rms voltage across the parallel microelectrodes increases to 0.04 V after wetting the channel (with no flow of electrolyte through it). With some trials of experiments it was found that the current values grow and decay exponentially and stay constant after 1 minute. In order to keep the uniformity in all the experiments, the fluid is allowed to flow in the channel for 1 minute and the flow is switched off for 1 minute before any other measurement. The current flowing across the pair of electrodes is calculated from the measured voltage across the standard resistor of 1 kΩ. The current exponentially grows when the flow is switched on and then stays constant. After switching off the flow, the current again decays exponentially until it reaches a constant value. The difference between two constant values of current gives the current increase due to flow and is measured in all the experiments.

Figures 4A, 4B:
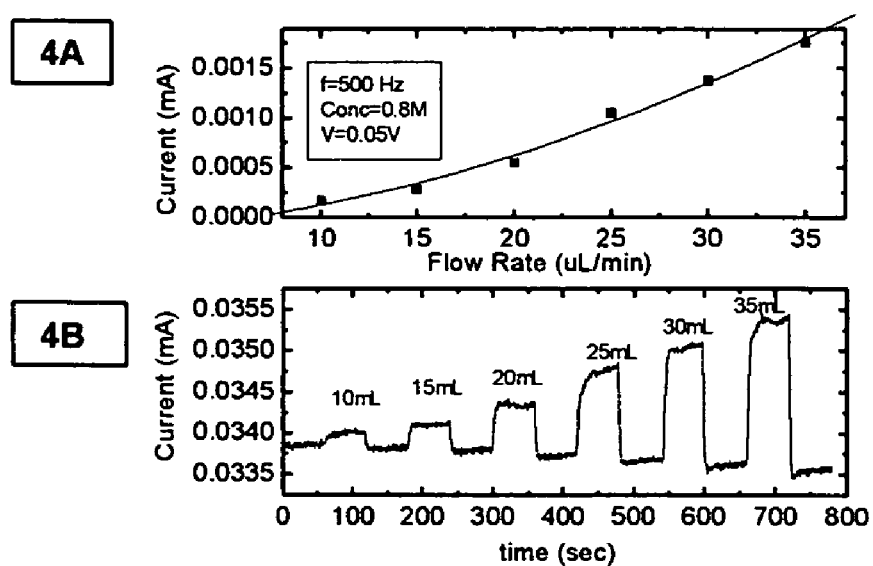

Flow of fluid is quantitatively analyzed for the flow sensor characteristics in steps of 5 μL/min, and an almost linear response was shown, as seen in FIG. 4, for the currents measured with flow rates. The ac frequency used in this case is 500 Hz at 0.05 V. As pointed out earlier, the current increase, which is a measure of admittance is proportional to the cube root of volume flow rate. NaOH is used in this paper as a convenient test solution to demonstrate the flow sensor. The problem with higher concentration NaOH is that it tends to absorb the atmospheric $CO_2$ and form carbonic acid. This is reflected in the drift of the baseline in FIG. 4a. The drift in the base line can be calibrated with respect to time. However this drift in base line is not for biochemical solutions that are buffered.

Figure 5:
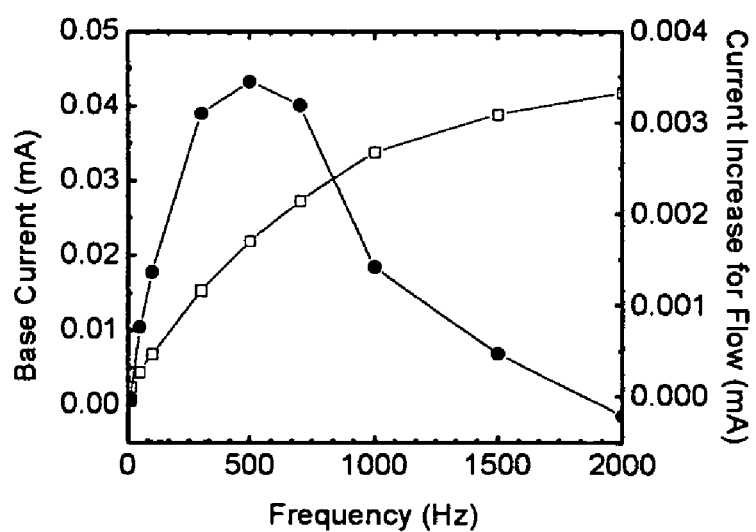
FIG. 5 is a graph showing the frequency response of the flow sensor for different applied frequency. The square symbols denote the static (no flow) response in the frequency sweep and the round symbols denote the increase in RMS current due to a flow of 10 µL/min, as described in Example 1.

In another experiment, the frequency of the ac signal is swept from 10 Hz to 5 kHz in steps of 10 Hz in the 10-100 Hz range, 100 Hz in the 100-1000 range and 1 kHz in the 1-5 kHz range. Since the equivalent circuit of the microchannel is capacitive dominant, the base current (with no flow) increases with frequency. At each frequency, the measurement of current before and after flow is brought to a constant value by waiting for 1 minute. The redistribution of ions in the channel causes an increase or decrease of current. It is observed that the admittance is maximized at 500 Hz as shown in FIG. 5. This is due to the competitive capacitive effects of the Ce and Cs as described earlier. It is to be understood that the efficiency of the flow sensor is found to be high at this frequency.

Figure 6:
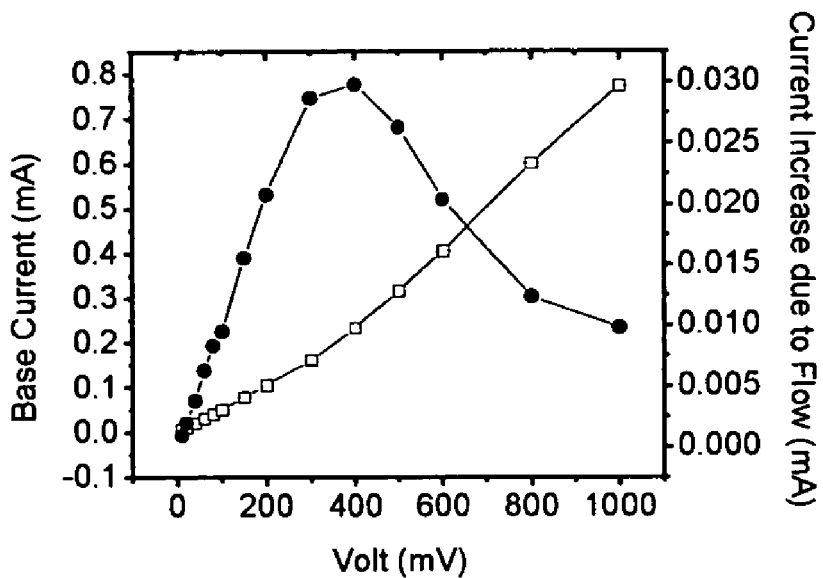
FIG. 6 is a graph showing characteristics of the flow sensor. The square symbols denote the RMS current for no flow and the round symbols denote the RMS current when flowrate is 10 µL/min. The optimization is to find the RMS voltage for which the sensor is more sensitive for the flow of fluid, as described in Example 1.

The ac voltage applied has a great influence on the flow driven current. Higher voltage increases the diffusive region in the channel that in turn decreases the diffusive capacitance (Cs). But the contribution of the capacitance at outer Helmholtz plane becomes more prominent and the admittance increases. Furthermore, at voltages more than 400 mV, partial electrolysis takes place and the effective current decreases with voltage. FIG. 6 shows the optimization of voltage of the ac signal used in the flow sensor. The V-I characteristic of the flow sensor (with no flow) shows a parabolic response similar to the conductivity measurement of electrolytes. Thus, the flow sensor is tuned for the ac voltage of 400 mV.

Figure 7:
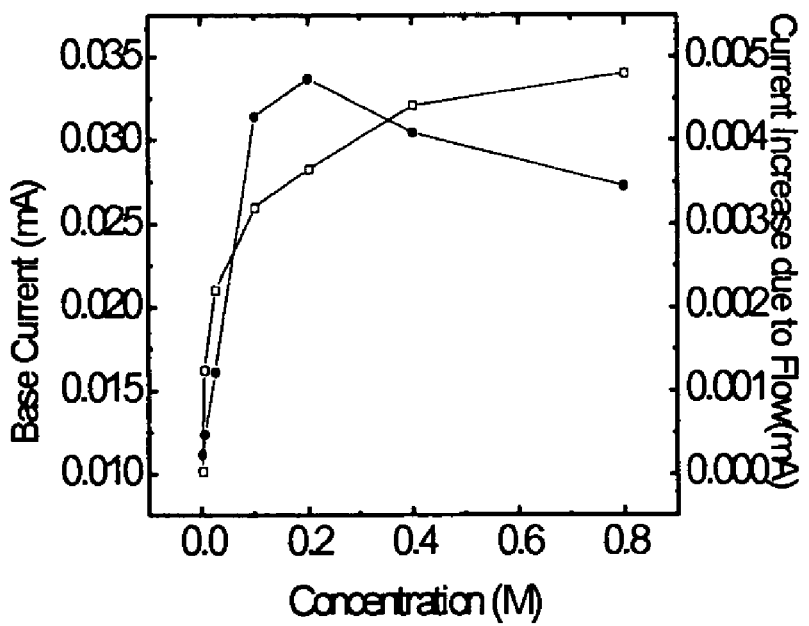
FIG. 7 is a graph showing dependence of concentration of the electrolyte to the flow. The square, circle and triangles are for 300, 500 and 700 Hz respectively of the ac voltage applied, as described in Example 1.

NaOH solutions of different concentrations were studied in the flow sensor. It is found that there is an optimum value of the concentration of the electrolyte for the flow sensor to be at its maximum efficiency. FIG. 7 shows that the concentration of the flow sensor is optimized at 0.2 M. At lower concentrations the admittance increases with more number of ions in the fluid system. When the ionic concentration is too large the flow of fluid does not further increase the admittance because of inter-ionic interactions. However generally the buffers or electrolytes used in microfluidic application are in millimolar concentration and the optimization of concentration is not necessary.

Figures 8A, 8B:
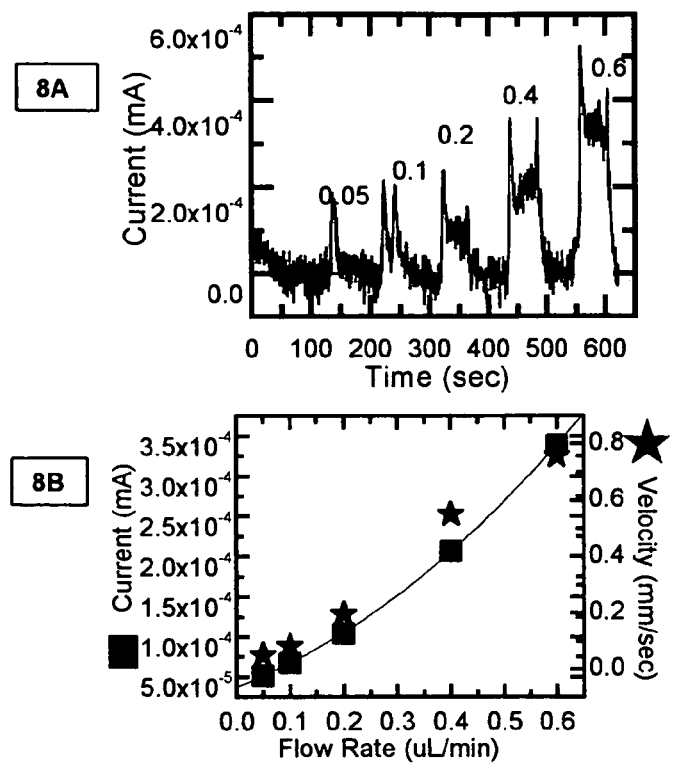
FIGS. 8A and 8B are graphs of current vs. time, showing the flow sensor response at very low flow rates, as described in Example 1.

Using the optimized electrical parameters (f=500 Hz, V=0.4 V and concentration=0.2 M), the flow sensor is designed for measuring very low values of flow rate starting at 0.05 μL/min (<1 nL/sec). The response shows a cube root behavior or even at very low flow rates as shown in FIG. 8. The sensitivity at these optimization is $5.2 \times 10^{-4}$ mA/(μL/min). In another experiment, fluorescent beads of diameter 2.5 μm are mixed with NaOH and sent through the channel. The motion of the beads at the flow rates 0.05, 0.1, 0.2, 0.4, and 0.6 μL/min are recorded using optical video microscopy at 30, 60, 120, 250, 250 frames/sec respectively, and the beads at a particular

TABLE 1

Sensitivity of various electrolytes and biochemical buffers tested using the flow sensor

| No. | Electrolytes/Buffers | Sensitivity (mA/(μL/min)) |
| --- | --- | --- |
| 1 | $CaCl_2$ | 1.2E–4 |
| 2 | KCl | 1.5E–4 |
| 3 | KOH | 2.8E–4 |
| 4 | D-PBS | 1.0E–4 |
| 5 | D-MEM | 3.2E–4 | stream are analyzed and averaged to predict the velocity response at very low flow rates. The sensor results are compared with the velocity of beads as denoted by the symbol '*' in FIG. 8 and shows similar response. Thus the calibration of the flow sensor is accomplished using the velocity measurements with beads.

Though NaOH is the fluid used in this particular example, it is to be appreciated that different electrolytes and biochemical buffers may be used. In fact, a number of different electrolytes and biochemical buffers have been tested for the sensitivity. $CaCl_2$, KCl and KOH (Fisher Scientific, Hampton, N.H.) and a concentration of 0.8 M is used. Dulbecco's Phosphase Buffered Saline (D-PBS) solution and Modified Eagle Medium (D-MEM) (high glucose) buffer (GIBCO, Invitrogen Corporation, Carlsbad Calif.) are useable in the same concentration. Optimization of frequency of the ac signal alone is done for the fluids at 50 mV rms applied voltage. The typical increase of currents is measured for the flow rate of 10 μL/min and the sensitivity values are tabulated in Table 1, as follows:

These buffers and reagents are used in chemical and biochemical experiments. When these fluids are used in lab-on-chips, the flow rates of the fluids can be determined using the flow sensor we described in this paper. It is to be noted that though we optimized the conductivity of the electrolyte for this study, it is not required and therefore the sensor can be used with arbitrary concentrations. Conductivity depends on the constituent materials and changing the conductivity of certain buffers/reagents will alter the biochemical reaction.

The principle of measuring electrical admittance laid out in this paper can be used to decipher parameters other than flow. There have been several reports on the detection of biomolecules and cells in lab-on-chip devices based on impedance spectroscopy of the solution. In these methods, the measurements are done with static fluids. By measuring impedance change due to different conditions of flow it is possible to investigate the constituents of the solution. In the future, impedance spectroscopy based on differential flow can thus be used to characterize electrolytes including biomolecules, cells or microbes under laminar flow.

Thus, in this example, a microfluidic flow sensor based on electrical admittance measurement is designed, fabricated and characterized. The efficiency of the flow sensor is maximized by the optimization of electrical parameters such as frequency and voltage of the applied ac signal. These optimized values are then used to measure flow rates as low as 1 nL/sec. The response of the flow sensor is compared with the velocity of microbeads in the same channel using video microscopy and image processing. Some of the advantages of the flow sensor include simplicity in design, integration to most microfluidic platforms, high signal-to-noise ratio, measurements of a wide range of liquids including biochemical buffers and compatibility with micromachining processes. This flow sensor has the potential to measure a broad range of liquid properties, including the characterization of biomolecules and microbes in microfluidic channels.

B. The Use of Electrical Admittance to Characterize and/or Distinguish Different Types of Particles, Compositions or Biospecies The admittance based microfluidic flow sensors of the above-described character may be used, not only to measure flowrates, but also to characterize and/or distinguish between various types of particles or biospecies (e.g., cell types, biochemicals, prions, microorganisms, cells containing different contents or substances such as drugs, drug delivery substances, toxins, metabolites, etc.) Examples 2 and 3 below are non-limiting examples of applications wherein the present invention is used to distinguish between different types of cells.

EXAMPLE 2

Figure 9:
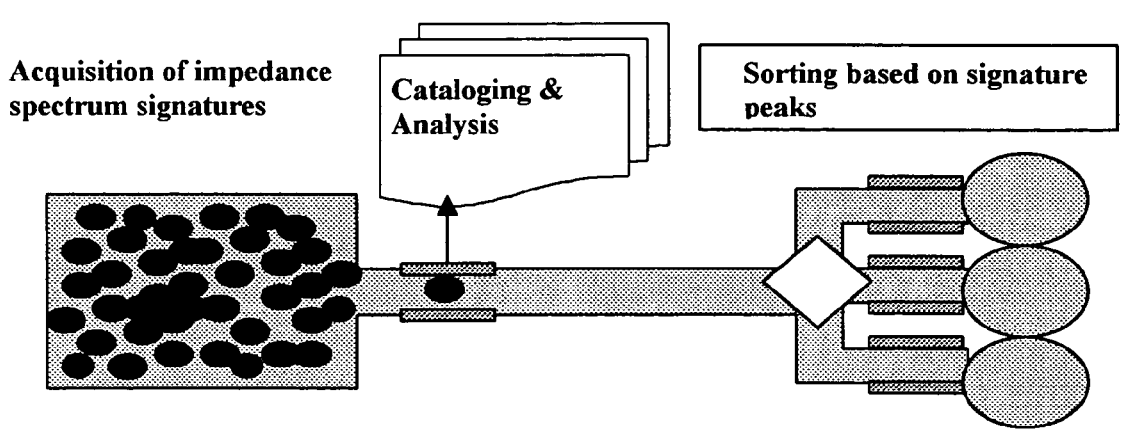
FIG. 9 is a flow diagram showing an example of a method for using an admittance sensor of the present invention to sort particles or biospecies, wherein the first electrode pair serves as a sensor and the three set of pairs of electrodes on the right serve MHD switches. Depending on the signature captured by the first pair of electrodes, each particle type or biospecies (e.g., cell type, cell content, different biochemicals, etc.) is sent to one of the three outlets, as described in Example 2.
Figure 10:
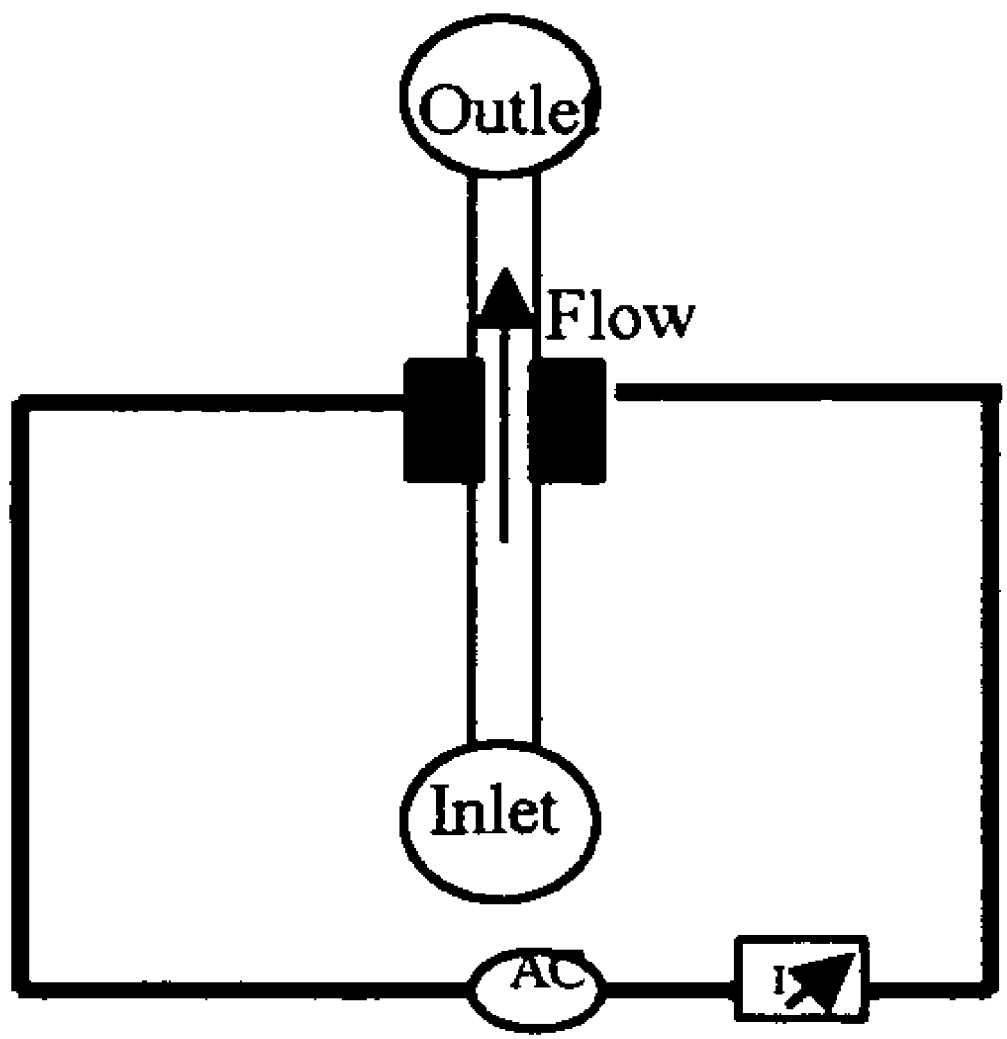
FIG. 10 is a schematic diagram of a flow induced admittance sensor of the present invention as used in Examples 2 and 3.

Characterization of Neural Cells for Cell Sorting Using Flow Induced Electrical Admittance Spectra in Microfluidics This example describes the use of flow induced admittance measurement that measures the contribution of the flow of a biofluid to the electrical admittance. This difference admittance spectra is characteristic for different biospecies and is used to sense different neural cells. This example also describes a cell cytometry technique based on electrical admittance of the neural stem cells (NSCs). FIG. 9 is a flow diagram showing a scheme for the sorting of cells using an admittance sensor and fluidic switches. Neural stem cells are self-renewing and multi-potential, giving rise to different types of progenitor cells that divide, but do not self-renew. This cytometry and control of NSCs based on electrical admittance is simple to use and is free from cell modification by markers and antibodies. A cross section of the fabricated sensor is shown in FIG. 10.

In this example, two types of neural cells are characterized and distinguished from each other using microfluidic flow induced electrical admittance spectroscopy in accordance with one embodiment of the present invention. The electrical admittance of the cells (with media) is determined at different frequencies while a) in a flowing state and b) in a non-flowing state. Characteristic peak, bandwidth of the peak and asymmetry of the peak are determined and used as the basis upon which to characterize and distinguish between neuroblastoma cells and stem cells. The cells are characterized to extract electrical signatures, thereby facilitating sorting and separation or isolation of the neuroblastoma cells and stem cells.

Neuroblastoma cells (B-103) and human neural stem cells (hNSCs) are cultured using D-MEM/F12 medium and are resuspended in L15 medium for the measurements. The measuring instrumentation comprises a signal generator (Model PCI 5401, National Instruments Corporation, Austin, Tex.) for stimulating the channel electrodes in the microfluidic device and a data acquisition card, (Model PCI 6024E, Manufacturer, City, State), connected through Keithley programmable amplifier 428 (Kiethly Instruments, Inc., Cleveland, Ohio), for measuring the current. The rms values of the current are measured in Labview at the sampling rate of 20,000 samples per second and every 10,000 samples are averaged. Microfluidic flow is maintained at a constant flow rate using a Harvard Picoplus Syringe pump (Harvard Apparatus, Holliston, Mass.). An ac signal of peak voltage 0.05 V with a frequency range from 10 Hz to 10 kHz is applied in the circuit. In order to keep the uniformity in all the experiments, the fluid is allowed to flow in the channel for 1 minute before any other measurement. The current flowing across the pair of electrodes is converted to voltage and amplified with a gain of 10E4-10E5 before the data acquisition. The current, being proportional to the magnitude of the complex admittance, is used as the magnitude of the complex admittance. Since this current is induced by flow, this is termed flow induced admittance. The unit of the Y-axis is mA if it were to be represented by flow induced current. The data represented for B-103 and hNSCs are in 10E-5 mA.

Figure 11A:
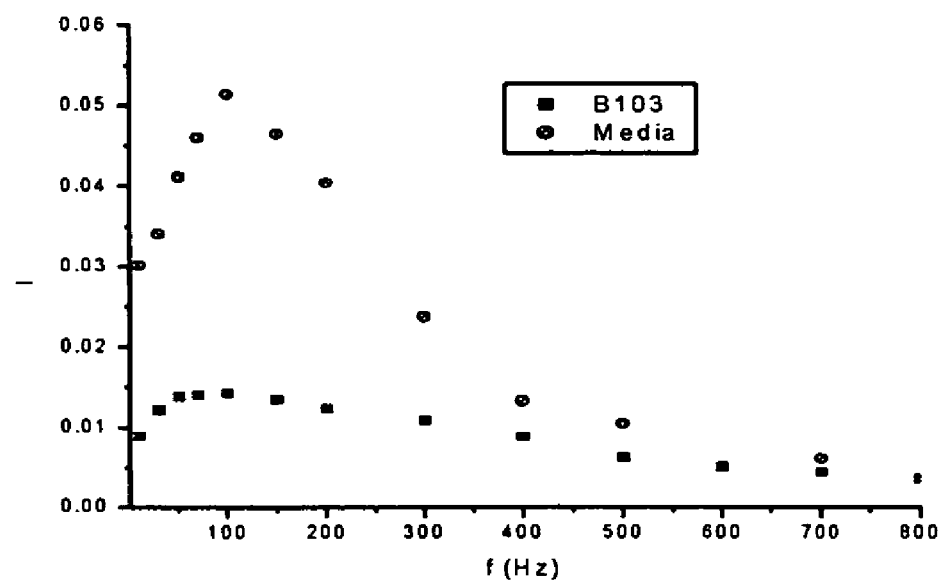
FIG. 11A is a graph of flow induced admittance spectra vs. stimulating ac voltage, showing the characterization of human stem cells.
Figure 11B:
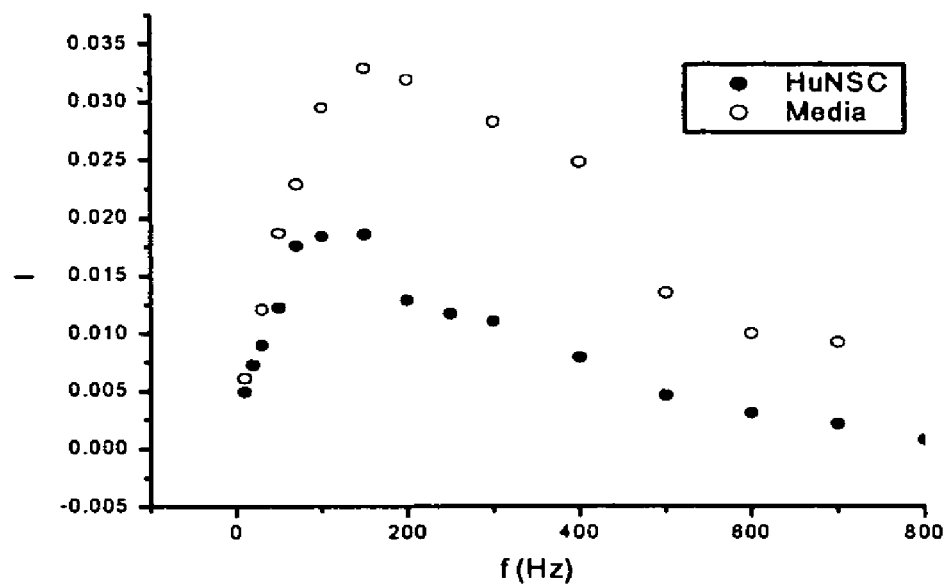
FIG. 11B is a graph of flow induced admittance spectra vs. stimulating ac voltage, showing the characterization of rat neuroblastoma (B103) cells along with their media, as described in Example 2.
Figure 12A:
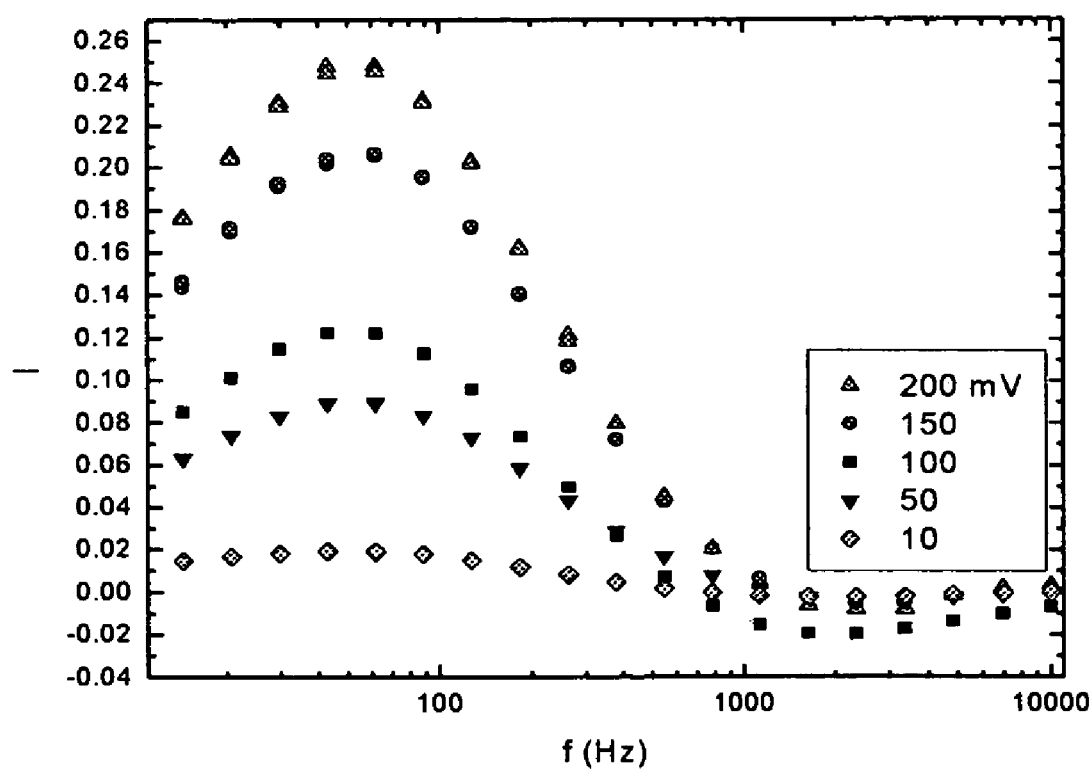
FIG. 12A is a graph showing flow induced admittance spectra at various stimulating ac voltages applied on B103 cells, as described in Example 2.
Figure 12B:
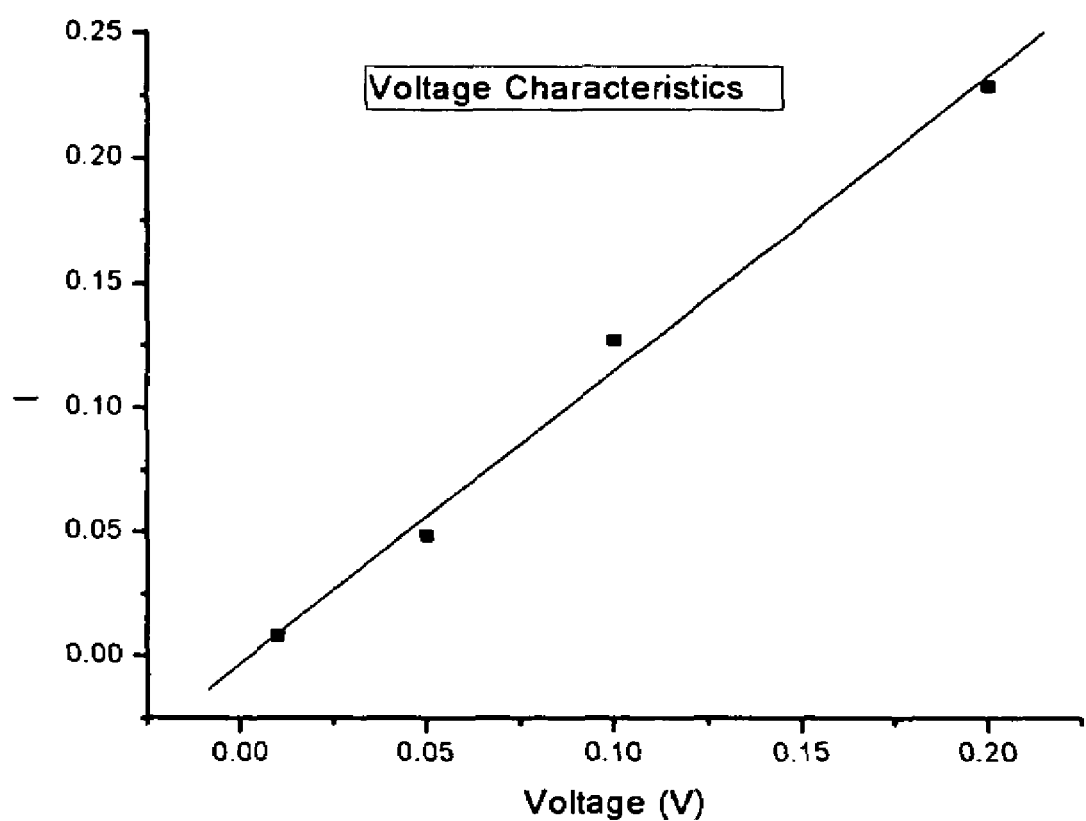
FIG. 12B is a graph showing the linear response of applied ac voltage with the measurement of flow induced admittance on B103 cells, as described in Example 2.

When cells are flowed along the electrodes in the channel, the electric double layer is perturbed giving rise to dielectric dispersion at different frequencies of the applied ac signal. Each cell is associated with a specific electrical signature based on the intrinsic electrical properties of its membrane and cytoplasm and this characteristic is utilized for cellular control. FIGS. 11A and 11B show the flow induced admittance spectra of B103 cells (FIG. 11A) and hNSCs (FIG. 11B) along with their media. As these plots indicate, the magnitude of admittance and the peak frequency decreased for the cells compared to the media. This shows that the medium does not penetrate the cell membrane which accounts for reduced admittance. FIGS. 12 A-12D show the response of the applied voltage on the cells. The peaks resolve well with the voltages and the voltage characteristics are linear. But it was found that the voltage response for KOH solution is non-linear. In FIGS. 12A-12D, the ac voltage used for the measurement of admittance is increased from 10 mV to 200 mV and the flow induced admittance is measured. In each measurement the voltage is fixed at a particular value and the corresponding values of admittance, with and without flow, are measured. FIG. 12A shows the flow-induced admittance of the B103 (neuroblastoma cells). The peak frequencies of the spectra remain constant while the amplitudes of the spectra grow linearly with the applied voltage. FIG. 12B shows the linearity of the amplitudes of the spectra.

Figure 12C:
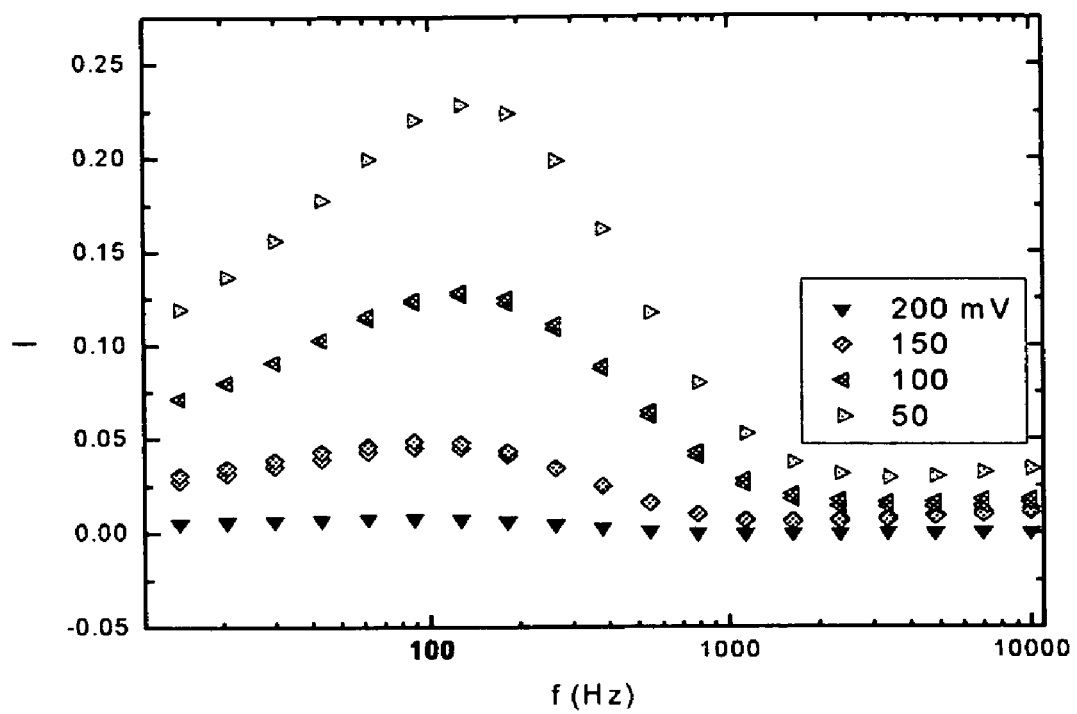
FIG. 12C is a graph shown flow induced admittance spectra at various stimulating ac voltages applied on human neural stem cells, as described in Example 2.
Figure 12D:
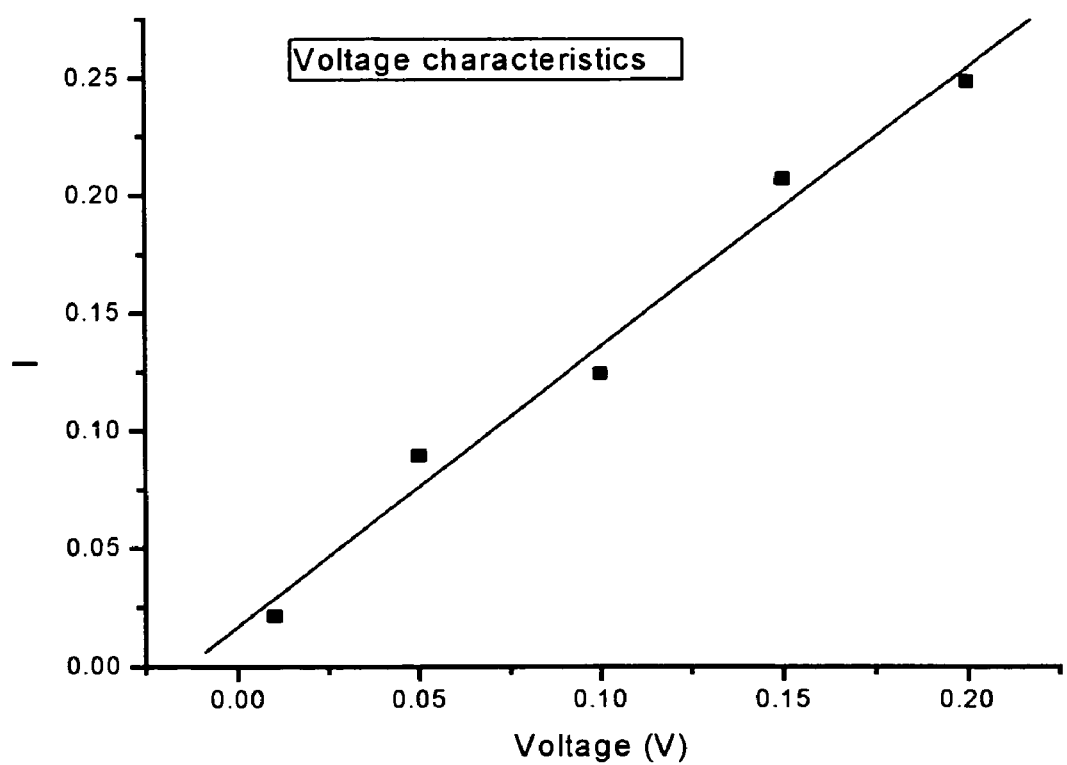
FIG. 12D Linear response of applied ac voltage with the measurement of flow induced admittance on human neural stem cells, as described in Example 2.

Similar voltage behavior is investigated for the human neural stem cells. The spectra are shown in FIG. 12C. The peak frequency is different from that of the B103 cells reflecting the characteristics of the cells. The applied ac voltages on the flow induced admittance spectra show a linear response (FIG. 12D) and the slopes corresponding to each is different. In order to characterize a cell the peak frequency and the slope of the voltage response curve of the flow induced admittance spectra can be used keeping the cell density constant.

Thus, in this example, neuroblastoma cells and human neural stem cells are characterized and distinguished from one another using flow induced admittance measurements. The cells show linear voltage characteristics with the magnitude of the flow induced admittance spectra.

EXAMPLE 3

Biochemical, Biomolecular and Cellular Sensing in Microfluidics Using Flow Induced Admittance Spectra In this paper, we present flow induced admittance spectra for electrolytes, cell culture media and neural cells using flow induced admittance spectra in a microfluidics device. The device comprises of a PDMS channel aligned with a pair of channel electrodes fabricated on glass. The peak of the flow induced admittance spectra and frequency at which the peak occurs are the key parameters used for the characterization of sensing.

Biosensing is one of the challenges of biotechnology and biomedical engineering. Moreover, recent micrototal analysis system requires biosensing in the fluidic circuits for the control and analysis of biomaterials. Most of the sensors use optical detection in the form of fluorescence spectroscopy, surface plasmon resonance, surface enhanced raman scattering, radiological detection or impedance measurements. The latter detection system has the advantages of needing very simple equipment to perform the measurement, easy sensor integration and miniaturization. The traditional impedance measurement of biomaterial has a very broad spectral response which cannot be used for distinguishing different biospecies. In this example, we present flow induced admittance measurements that measure the contribution of the flow of a biofluid to the electrical admittance. This difference admittance spectra is characteristic for different biospecies and is used in this paper to sense different biochemicals and biomaterials including neural cells In this example, the sensor is fabricated on a glass substrate with gold surface electrodes as shown in FIGS. 1, 2A and 2B. The microfluidic channel is made on PDMS. Gold metal of thickness 100 nm is deposited on a adhesion layer of titanium with thickness 20 nm using e-beam deposition. A spinned layer of Shipley photoresist (1827) (Rohm & Haas Electronic Materials, Phoenix, Ariz.) is used for patterning the metal. The electrodes are patterned by etching gold and titanium by potassium iodide solution (Kl+$I_2$+ $H_2O$=4:1:40) and 2% HF respectively. The Shipley photoresist is removed with acetone. The distance between the electrodes is 100 μm and the length of the electrodes is 5 mm. Gold electrical lines are patterned on the glass for the electrical measurement. Measurement is done across one of the three electrodes. PDMS channels of width 500 μm are made from an SU8 mold. Glass and PDMS are bonded together after treatment with oxygen plasma for 1 minute. The fluidic channel is aligned with the parallel electrodes using a stereo microscope.

Figure 13:
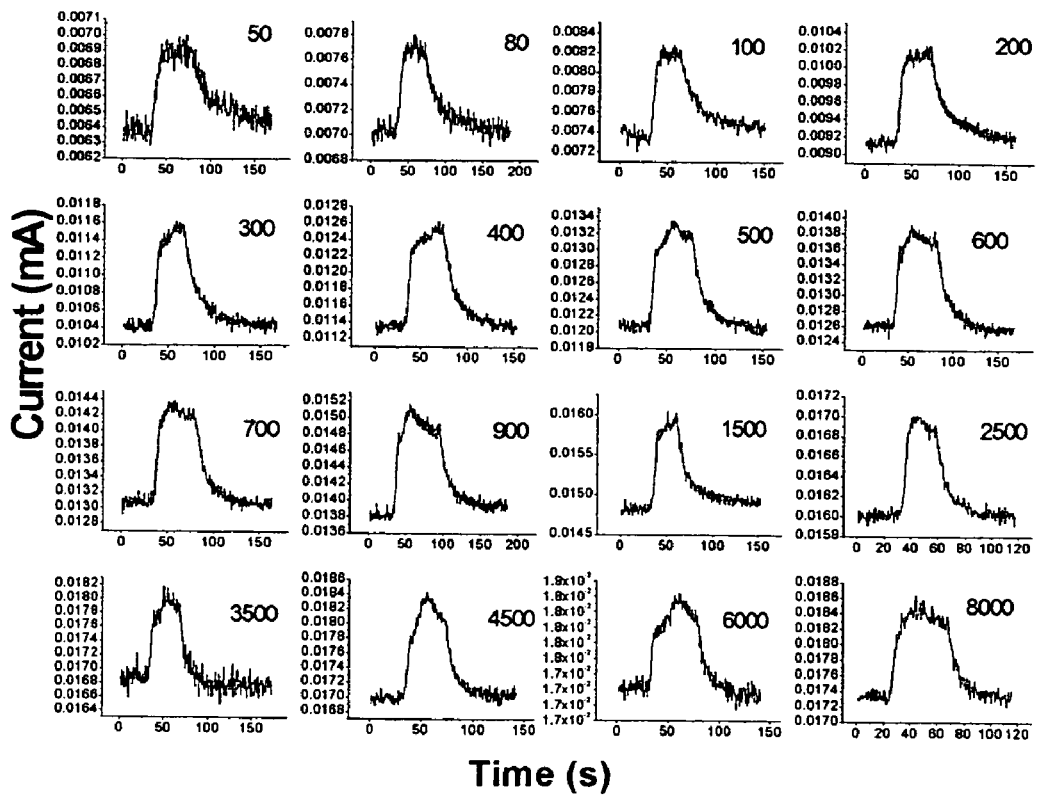
FIG. 13 is a collection of graphs of current vs. time showing typical chronoamperometric measurements at different ac frequencies (frequency is in Hz marked in each graph), as described in Example 3.

Biochemical buffers like PBS, DMEM are bought from Invitrogen. NaOH and KOH are bought from Fisher Scientific and made a concentration of 0.8M in nanopure water. Salmon Sperm DNA and *E. Coli* Bacteria are received from a biological chemistry lab. In order to get different sizes of DNA, ultrasonicator is used. The DNA solution with the original size is labeled as 'Big DNA', the DNA solution resulted after the sonication of 2 minutes is 'small DNA' and sonication after 10 minutes is 'smaller DNA'. Neuroblastoma cells and Human neuro stem cells are received from a pathology lab The measuring instrumentation consists of National Instruments' signal generator, PCI 5401 for stimulating the channel electrodes in the microfluidic device and a data acquisition card, PCI 6024E connected through Keithley's programmable amplifier, 428 for measuring the current. The rms values of the current are measured in Labview with a sampling rate of 20,000 samples/sec and averaging every 10,000 samples. Microfluidic flow is maintained at a constant flow rate using a Harvard Picoplus Syringe pump. An ac signal of peak voltage 0.05 V with a frequency range from 10 Hz to 10 kHz is applied in the circuit. In order to keep the uniformity in all the experiments, the fluid is allowed to flow in the channel for 1 minute before any other measurement. The current flowing across the pair of electrodes is converted to voltage and amplified with a gain of 10E4-10E5 before the data acquisition. The current exponentially grows when the flow is switched on, and then stays constant. After switching off the flow, the current again decays exponentially until it reaches a constant value as shown in FIG. 13. The difference between two constant values of current gives the current increase due to flow and is measured in all the experiments at different frequencies. This current being proportional to the magnitude of the complex admittance is used as magnitude of the complex admittance. Since this current is induced by flow this is termed as flow induced admittance. The unit of the Y-axis is mA if it were to be represented by flow induced current. The data represented for *E. coli* and neural cells are in 10E-5 mA.

Figure 14:
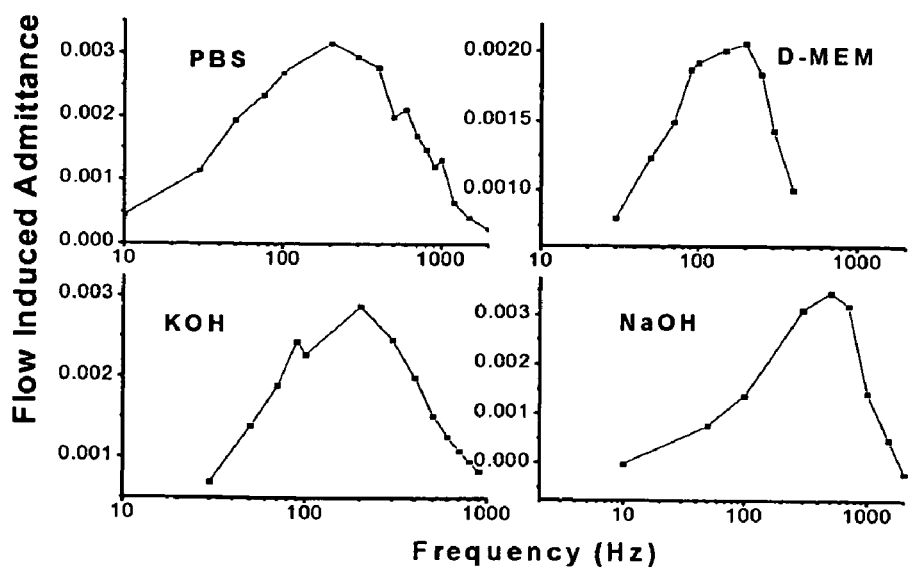
FIG. 14 is a collection of graphs of flow induced admittance vs. frequency for four different biochemical buffers as explained in the 'materials' section, as described in Example 3.

FIG. 14 shows the flow induced admittance spectra of four biochemical buffers as labeled in each graph. The graphs have a maximum admittance at a particular frequency of the applied ac signal and band width corresponding to each solution at its concentration. PBS and D-MEM buffers have the peak around 200 Hz but the bandwidth is different whereas KOH and NaOH has the peak frequency at 200 Hz and 500 Hz respectively. Thus the flow induced admittance spectra distinguishes between different biochemical buffers.

Figure 15:
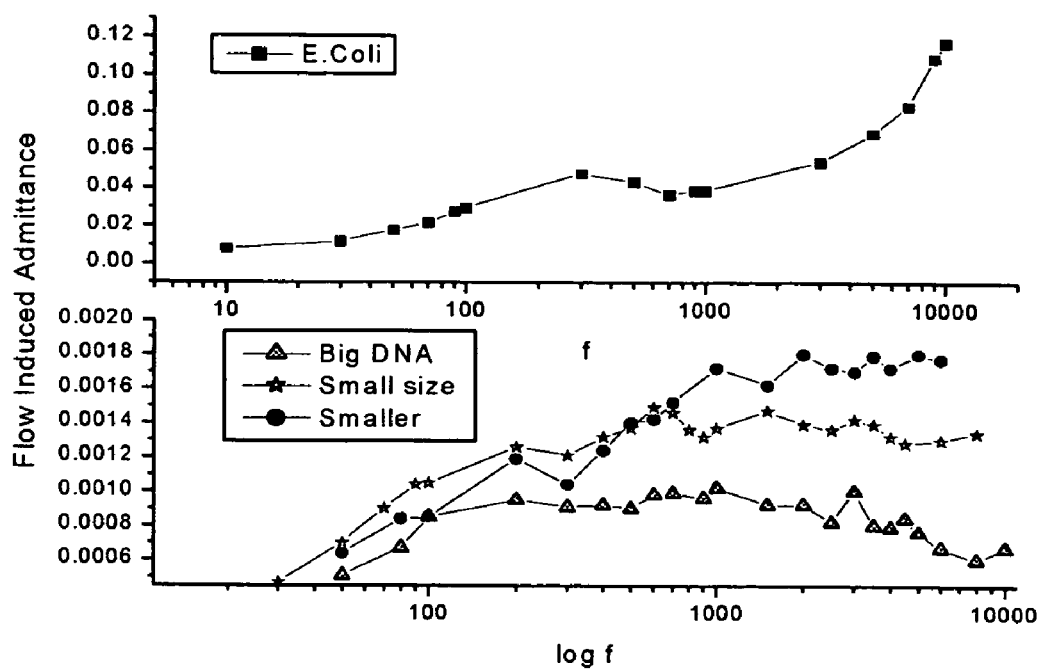
FIG. 15 is a collection of graphs of flow induced admittance vs. log f showing measurements with (a) *E. Coli* (b) DNA at different sizes, as described in Example 3.

FIG. 15 shows the flow induced admittance spectra due to *E. Coli* and three different sizes of DNA. These nanoparticles show a broad peak in the flow induced admittance spectrum. The spectra shown for *E. Coli* is background-subtracted with its media. The three sizes of DNA solutions in nanopure water were identical before sonication. The electrical conductivity of the DNA solution, 'Smaller' (which was sonicated for longer time) is larger than the other two. It is observed in FIG. 15 that the 'Smaller' DNA solution showed larger magnitudes of flow induced admittance and the 'Big' DNA solution shows smaller magnitudes of flow-induced admittance.

Figure 16:
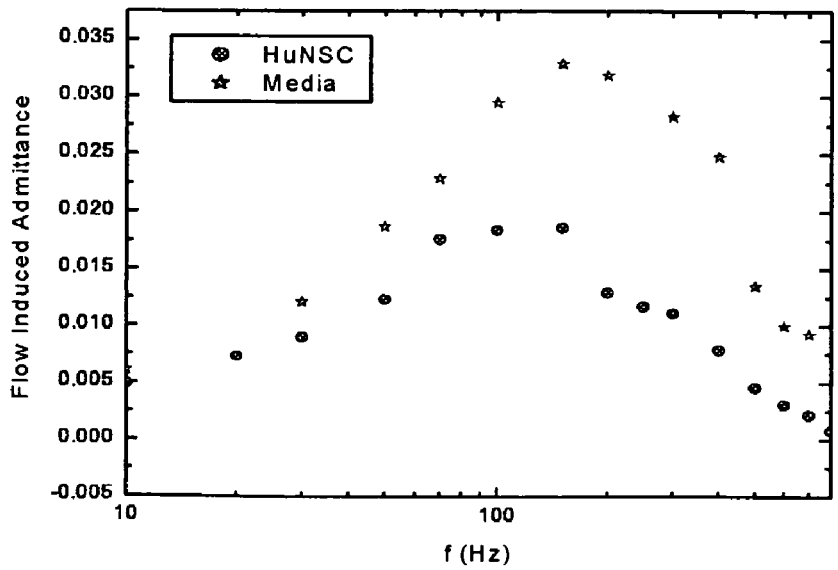
FIG. 16 is a graph of flow induced admittance vs. frequency comparing neuro stem cells to the media, as described in Example 3.
Figure 17:
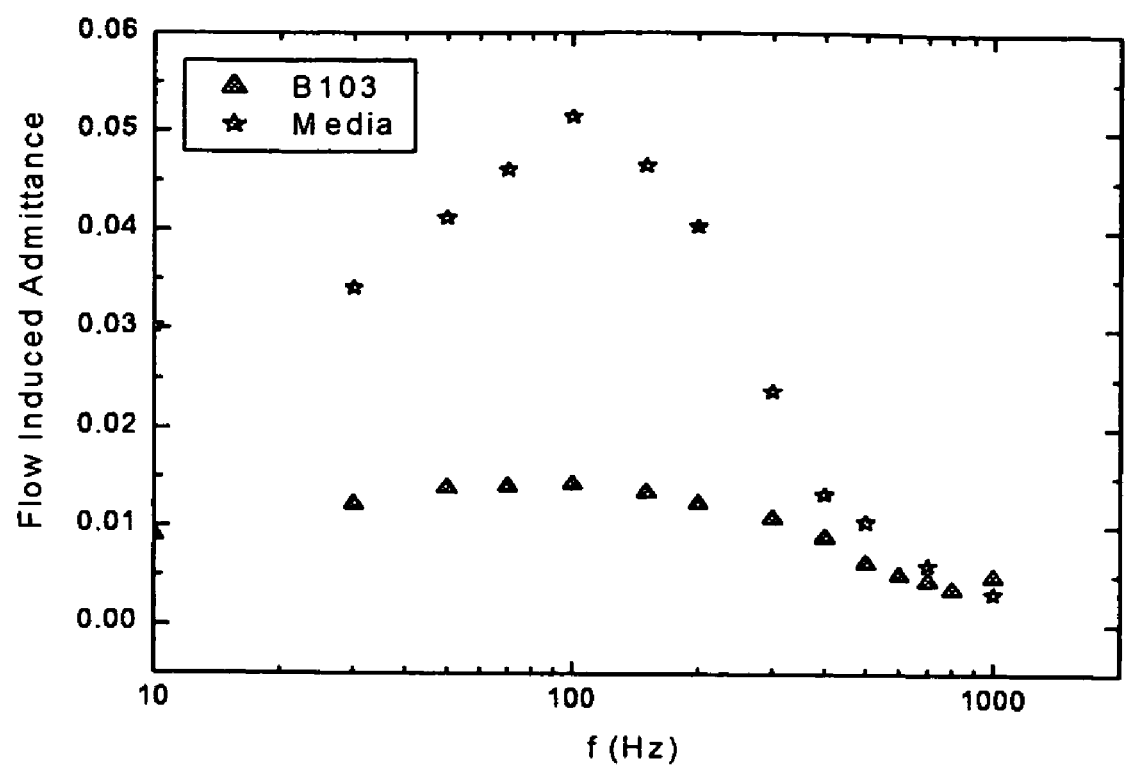
FIG. 17 is a graph of flow induced admittance vs. frequency comparing neuroblastoma cells to the media, as described in Example 3.

FIGS. 16 and 17 show the flow induced admittance spectra of neuroblastoma (B103) cells and Human neural stem cells (Hu NSC) along with their media respectively. As these plots indicate, the magnitude of admittance and the peak frequency decreased for the cells compared to the media. This shows that the media does not penetrate the cell membrane and the effective admittivity of the medium and the cells reduces.

When a fluid is flowed along a pair of electrodes in the microchannel the admittance across the electrodes increases and there is critical frequency at which the admittance is a maximum. Interaction between the electrical and viscous stress on the fluid is the main cause that gives rise to spectroscopic behavior. As explained elsewhere in this patent application, the critical frequency can be expressed as $$f_c = \frac{\sigma}{2\pi\varepsilon}$$

where σ and ε are the electrical properties of conductivity and permittivity of the buffer solution, respectively. For $f<f_c$, the electrical field functions in a resistive manner, while the double layer functions in a capacitive manner.

Thus, in this example, the sensor characterizations of three sizes of particles in solutions have been studied. The peak frequency depends on the conductivity and dielectrivity of the solution. The bandwidth of the spectral behavior depends on the size of the particles in the solution.

It is to be appreciated that the invention has been described hereabove with reference to certain examples or embodiments of the invention but that various additions, deletions, alterations and modifications may be made to those examples and embodiments without departing from the intended spirit and scope of the invention. For example, any element or attribute of one embodiment or example may be incorporated into or used with another embodiment or example, unless to do so would render the embodiment or example unsuitable for its intended use. All reasonable additions, deletions, modifications and alterations are to be considered equivalents of the described examples and embodiments and are to be included within the scope of the following claims.

What is claimed is:

1. A method of measuring the flow rate of a conducting fluid in a microchannel, comprising:
   a) applying a voltage across a pair of electrodes placed in the microchannel;
   b) determining the current flowing across the electrodes;
   c) comparing the current determined in Step B to a base current with no flow between the electrodes; and
   d) determining the flow-induced electrical admittance at different frequencies by calculating the change in flow rate as a function of the change in current.

2. The method according to claim 1, wherein the step of applying a voltage comprises applying an ac voltage across the electrodes in series with a resistor.

3. The method according to claim 2, wherein the step of calculating the current comprises measuring the rms voltage across the resistor.

4. The method according to claim 1, wherein the electrodes are placed parallel to the line of flow.

5. The method according to claim 2, wherein the step of applying an ac voltage comprises applying the voltage at an optimized frequency.

6. The method according to claim 5, wherein the frequency is approximately 500 Hz.

7. The method according to claim 6, wherein the step of applying an ac voltage comprises applying an optimized voltage.

8. The method according to claim 7, wherein the ac voltage is approximately 400 mV.

9. The method according to claim 1, wherein the conducting fluid comprises an electrolyte solution or suspension, and further comprising a step of selecting an optimum concentration of the electrolyte.

10. The method according to claim 9, wherein the electrolyte is NaOH and the concentration is about 0.2 M.

11. A transducer or other device for measuring the flow rate of a conducting fluid in a microchannel, comprising:
   a) electrodes positioned substantially parallel to the line of flow;
   b) means for applying a voltage across the electrodes; and
   c) means for measuring the current across the electrodes and for determining electrical admittance at different frequencies based on measurement of current across the electrodes.

12. A transducer or other device according to claim 11, wherein the transducer comprises a microfluidic device including a substrate formed of a first material and an upper layer formed of a second material.

13. A transducer or other device according to claim 11, wherein the electrodes are located on one of the layers and the microchannel is located on or in the other layer.

14. A transducer or other device according to claim 12, wherein the first material is a glass.

15. A transducer or other device according to claim 12, wherein the second material is polydimethylsiloxane (PDMS).

16. A transducer or other device according to claim 11, wherein the means for applying a voltage comprises means for applying an ac voltage.

17. A transducer or other device according to claim 11, wherein the means for measuring the current comprises:
   a) a resistor placed in series with the electrodes; and
   b) means for measuring the rms voltage across the resistor.

18. A method for characterizing or distinguishing between different types of particles, different chemical compositions or different biospecies, said method comprising the steps of:
   a) providing a device for measuring flow-induced electrical admittance spectra of the different types of flowing particles or different biospecies;
   b) using the device to measure the flow-induced electrical admittance spectra of the different types of particles or different biospecies; and
   c) characterizing different flowing particles or different biospecies on the basis of differences in their respective flow-induced electrical admittance spectra.

19. A method according to claim 18 further comprising the step of:
   d) sorting the different particles, compositions or biospecies.

20. A method according to claim 18 wherein the device provided in Step a comprises:
   a flow channel through which the particles, compositions or biospecies may flow in a direction of flow;
   electrodes positioned substantially parallel to the line of flow;
   a power source for applying a voltage across the electrodes; and
   measuring apparatus for measuring the current across the electrodes and for determining electrical admittance spectra based on such current measurements.

21. A method according to claim 19 wherein the sorting is carried out through the use of fluidic switches.

22. A method according to claim 18 wherein the different particles, compositions or biospecies comprise biological cells of different type.

23. A method according to claim 22 wherein the method is employed to distinguish or sort stem cells from other cells.

24. A method according to claim 18 wherein the different particles, compositions or biospecies comprise different chemical compositions.

25. A method according to claim 18 wherein the different particles, compositions or biospecies comprise different prions.

26. A method according to clam 18 wherein the different particles, compositions or biospecies comprise different microorganisms.

27. A method according to clam 18 wherein the different particles, compositions or biospecies comprise cells containing different contents or substances.

28. A method according to claim 27 wherein the cells containing different contents or substances are selected from the group consisting of:
   cells containing different drugs;
   cells containing different therapeutic substances;
   cells containing different markers or diagnostic agents;
   cells containing different dyes;
   cells containing different drug delivery substances;
   cells containing different toxins; and
   cells containing different metabolites.

* * * * *